(12) United States Patent
Cheung

(10) Patent No.: US 10,218,657 B2
(45) Date of Patent: Feb. 26, 2019

(54) METHOD AND SYSTEM FOR PROVIDING PRIVATE CHAT WITHIN A GROUP CHAT

(71) Applicant: Alibaba Group Holding Limited, George Town, Grand Cayman (KY)

(72) Inventor: Chong Shing Cheung, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 345 days.

(21) Appl. No.: 15/068,203

(22) Filed: Mar. 11, 2016

(65) Prior Publication Data

US 2016/0277335 A1    Sep. 22, 2016

(51) Int. Cl.
  *H04L 12/58* (2006.01)
  *H04L 12/18* (2006.01)

(52) U.S. Cl.
  CPC .......... *H04L 51/12* (2013.01); *H04L 12/1822* (2013.01); *H04L 51/04* (2013.01); *H04L 51/046* (2013.01)

(58) Field of Classification Search
  CPC ... H04L 51/12; H04L 51/046; H04L 12/1822; H04L 51/04
  See application file for complete search history.

(56) References Cited

U.S. PATENT DOCUMENTS

| | | |
|---|---|---|
| 7,035,923 B1 | 4/2006 | Yoakum |
| 7,133,687 B1 | 11/2006 | El-Fishawy |
| 7,603,413 B1 * | 10/2009 | Herold ................ G06Q 10/10 455/466 |
| 7,835,955 B1 | 11/2010 | Brodsky |
| 8,165,609 B2 | 4/2012 | Fang |
| 8,316,096 B2 | 11/2012 | Svendsen |
| 8,355,699 B1 | 1/2013 | Lo |
| 8,548,865 B1 | 10/2013 | Ho |
| 8,670,791 B2 | 3/2014 | Ye |
| 8,768,310 B1 | 7/2014 | Oroskar |
| 8,769,022 B2 | 7/2014 | Tivyan |
| 8,788,602 B1 | 7/2014 | Wan |
| 8,856,244 B2 | 10/2014 | Madnani |
| 8,880,725 B2 | 11/2014 | Ananthanarayanan |

(Continued)

FOREIGN PATENT DOCUMENTS

| | | |
|---|---|---|
| JP | 2011517380 | 6/2011 |
| JP | 2014106592 | 6/2014 |

(Continued)

*Primary Examiner* — Krisna Lim
(74) *Attorney, Agent, or Firm* — Shun Yao; Park, Vaughan, Fleming & Dowler LLP

(57) ABSTRACT

Embodiments of the present application provide a method and system for private chat within a group chat. During operation, the system receives, at a server from a computing device, a first message that includes a first private chat identifier, private chat counterpart information, and private chat content data. The system determines a private chat counterpart client based on the first private chat identifier and the private chat counterpart information. The private chat counterpart client and the computing device are both participating in the group chat. The system generates a private chat message based on the first message including the private chat content data, and sends the private chat message to the private chat counterpart client without sending the private chat message to all members participating in the group chat.

16 Claims, 10 Drawing Sheets

(56) References Cited

U.S. PATENT DOCUMENTS

| | | |
|---|---|---|
| 8,968,103 B2 | 3/2015 | Zhou |
| 9,021,040 B1 | 4/2015 | Andrews |
| 9,117,197 B1 | 8/2015 | Sharma |
| 9,143,477 B2 | 9/2015 | Murthy |
| 9,185,062 B1 | 11/2015 | Yang |
| 9,230,244 B2 | 1/2016 | Patil |
| 9,253,639 B1 | 2/2016 | Lafuente |
| 2002/0016163 A1 | 2/2002 | Burgan |
| 2002/0120453 A1 | 8/2002 | Lee |
| 2003/0084109 A1 | 5/2003 | Balluff |
| 2003/0135559 A1 | 7/2003 | Bellotti |
| 2003/0154249 A1 | 8/2003 | Crockett |
| 2004/0002932 A1 | 1/2004 | Horvitz |
| 2004/0006599 A1 | 1/2004 | Bates |
| 2004/0102962 A1 | 5/2004 | Wei |
| 2006/0093142 A1 | 5/2006 | Schneier |
| 2007/0299565 A1 | 12/2007 | Oesterling |
| 2008/0114776 A1 | 5/2008 | Sun |
| 2008/0307040 A1* | 12/2008 | So ............... G06Q 10/10 709/203 |
| 2009/0018903 A1 | 1/2009 | Iyer |
| 2009/0287776 A1 | 11/2009 | Corry |
| 2010/0005402 A1 | 1/2010 | George |
| 2010/0023341 A1 | 1/2010 | Ledbetter |
| 2010/0205541 A1 | 8/2010 | Rapaport |
| 2010/0323752 A1 | 12/2010 | Park |
| 2011/0136431 A1 | 6/2011 | Haaramo |
| 2011/0173548 A1 | 7/2011 | Madnani |
| 2011/0243113 A1 | 10/2011 | Hjelm |
| 2012/0030301 A1 | 2/2012 | Herold |
| 2012/0108268 A1 | 5/2012 | Lau |
| 2012/0185547 A1 | 7/2012 | Hugg |
| 2013/0080580 A1 | 3/2013 | Nagai |
| 2013/0138726 A1 | 5/2013 | Shin |
| 2013/0144702 A1 | 6/2013 | Tabor |
| 2013/0173723 A1* | 7/2013 | Herold ............ G06Q 10/10 709/206 |
| 2013/0227041 A1 | 8/2013 | Rideout |
| 2013/0268418 A1 | 10/2013 | Sardi |
| 2013/0268765 A1* | 10/2013 | Kent, Jr. ............ G06Q 10/107 713/179 |
| 2013/0298006 A1 | 11/2013 | Good |
| 2013/0311920 A1 | 11/2013 | Koo Bon Joon |
| 2013/0332162 A1 | 12/2013 | Keen |
| 2014/0025546 A1 | 1/2014 | Seng |
| 2014/0191986 A1 | 7/2014 | Kim |
| 2014/0280615 A1 | 9/2014 | Burlin |
| 2014/0331150 A1 | 11/2014 | Griffin |
| 2014/0372516 A1 | 12/2014 | Watte |
| 2015/0081486 A1 | 3/2015 | Niazi |
| 2015/0170104 A1 | 6/2015 | Yamada |
| 2015/0207926 A1 | 7/2015 | Brown |
| 2015/0256353 A1 | 9/2015 | Busey |
| 2015/0264303 A1 | 9/2015 | Chastney |
| 2015/0296450 A1 | 10/2015 | Koo |
| 2015/0310567 A1 | 10/2015 | Wu |
| 2015/0317590 A1 | 11/2015 | Karlson |
| 2015/0350225 A1 | 12/2015 | Perold |
| 2016/0055215 A1 | 2/2016 | Kauwe |
| 2016/0094509 A1* | 3/2016 | Ye ............... H04L 51/32 709/206 |
| 2016/0125363 A1 | 5/2016 | Hung |
| 2016/0132971 A1 | 5/2016 | Teh |
| 2016/0242007 A1 | 8/2016 | Mihara |
| 2017/0041255 A1* | 2/2017 | Dong ............... H04L 51/04 |
| 2017/0142212 A1 | 5/2017 | Bifulco |
| 2017/0185965 A1 | 6/2017 | Nishizawa |
| 2017/0228699 A1 | 8/2017 | Pang |

FOREIGN PATENT DOCUMENTS

| | | |
|---|---|---|
| JP | 2014115716 | 6/2014 |
| WO | 1999037052 | 7/1999 |
| WO | 2007007330 | 1/2007 |
| WO | 2011117456 | 9/2011 |
| WO | 2014008782 | 1/2014 |
| WO | 2015017029 | 2/2015 |
| WO | 2015113458 | 8/2015 |
| WO | 2016016248 | 2/2016 |
| WO | 2016050146 | 4/2016 |
| WO | 2016054629 | 4/2016 |

* cited by examiner

METHOD AND SYSTEM FOR PROVIDING PRIVATE CHAT WITHIN A GROUP CHAT

RELATED APPLICATION

Under 35 U.S.C. 119, this application claims the benefit and right of priority of Chinese Patent Application No. 201510125115.8, filed 20 Mar. 2015.

BACKGROUND

Field

The present invention relates to instant messaging systems, and particularly relates to a method and system for providing private chat within a group chat.

Related Art

With the development of network and mobile communications, instant messaging has become one of the most common forms of communication. Instant messaging services and tools provided by web portal and platform operators (e.g. MSN, QQ) are essential services to users. Instant messaging is based on a client-server infrastructure in which the client provides a chat window that includes a display area and an input area. The display area displays the messages sent and received by the user, while the user inputs a message in the input area. Subsequently, the client sends the message entered by the user to the server, which forwards the message to other clients belonging to other users. Instant messaging is mainly divided into three modes, e.g., "one to one," "one to many," and "many to many," among which "many to many" refers to group chat mode. That is, group members can see the chats of all members and chat with all members in a common group, which means a member can receive messages from all members, and messages can be sent to all members at the same time.

In general, members can join both a group chat and a private chat within a group under normal group chat mode. Private chat means that the member can select another member or multiple members for chatting. If only one member is selected, the client may generate a new chat window for "one to one" instant messaging with such member. If multiple members are selected, the client may generate a new group chat window (e.g., usually in the form of discussion groups) for "one to many" instant messaging with such multiple members. The client may generate a new private chat window (e.g., for "one to one" or "many to many" chat), by which the member can only chat in the private chat window. Group chat continues in the original group chat window, and the member needs to switch between the private chat window and the group chat window to view and send messages. If a member wants to chat privately with a plurality of individuals and teams, the member may need to increase the number of private chat windows, which hinders quick and efficient communication with people.

SUMMARY

One embodiment of the present invention provides a system for private chat within a group chat performed by a server. During operation, the system receives, at the server from a computing device, a first message that includes a first private chat identifier, private chat counterpart information, and private chat content data. The server may determine a private chat counterpart client based on the first private chat identifier and the private chat counterpart information. The private chat counterpart client and the computing device are both participating in the group chat. The server may then generate a private chat message based on the first message including the private chat content data. The server may then send the private chat message to the private chat counterpart client without sending the private chat message to all members participating in the group chat.

In a variation of this embodiment, the private chat message includes a second private chat identifier which allows the private chat counterpart client to determine that the private chat message is privately sent to the private chat counterpart client without being sent to other group members participating in the group chat.

In a variation of this embodiment, the system may determine that the first private chat identifier is a selection identifier, and determine that a client corresponding to the private chat counterpart information is a private chat counterpart client.

In a variation on this embodiment, the system may determine that the first private chat identifier is an exclusion identifier. The system may then remove a client corresponding to the private chat counterpart information from a client list, and determine that the remaining clients of the client list are private chat counterpart clients.

In a variation on this embodiment, the system may receive a second message from the computing device. The second message includes a private chat counterpart exclusion identifier, private chat counterpart exclusion information, and second private chat content data. The system may then remove a client corresponding to the private chat counterpart exclusion information from a client list based on the private chat counterpart exclusion identifier and private chat counterpart exclusion information, in which the remaining clients on the client list are private chat counterpart clients. The system may then generate a private chat message based on the second message that includes the second private chat content data. The system may then send the private chat message only to the private chat counterpart clients.

In a variation on this embodiment, the system may receive input information sent from a publishing client. The input information includes a first directed identifier, directed counterpart information and publishing content information. The system may then determine a directed counterpart client based on the first directed identifier and the directed counterpart information. The system may generate a directed message based on the input information, and send the directed message only to the directed counterpart client.

Another embodiment of the present invention provides a system for private chat within a group chat. During operation the system receives input information from a user on the computer. The computer is a client computing device. The system then generates a first message based on the input information. The first information includes a first private chat identifier, private chat counterpart information, and private chat content data. The first message allows a server to determine a client that is a private chat counterpart based on the first private chat identifier and private chat counterpart information, generate a private chat message based on the first message, and send the private chat message only to the client that is the private chat counterpart. The system then sends the first message to the server, and receives a message sent by the server and displays the message.

In a variation on this embodiment, the system receives, from the server, a message that includes a group chat message and a private chat message, in which the private chat message includes a second private chat identifier. The system may then determine, based on the second private chat identifier, that one of the two messages is a private chat message. The system may then display the group chat message and private chat message differently.

In a variation on this embodiment, the system adds a private chat message reply area to a private chat message display box depicted on a display area of the client computing device. The system then receives a user's private chat message reply through the private chat message reply area. In response to receiving the user's private chat message reply, the system may automatically add to the user's private chat message reply the first private chat identifier and the private chat counterpart information.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which.

DETAILED DESCRIPTION OF EMBODIMENTS

Embodiments of the present invention solve the problem of inefficient private and group chat by allowing a user to easily and efficiently perform private chat within a group chat. A user can direct a private message to another person within the group chat. The user can also exclude one or more members when sending a message within the group chat. Multiple fans may also follow a user, and the user may publish messages to specific fans or exclude certain fans from receiving published messages.

Group Chat Mode

In group chat mode (e.g., "many to many" mode), a user creates a group and adds group members using a client mobile device, and then the client sends a group creation request to the server. The server generates and registers a group account, and may generate a list of client members for this group account (e.g., usually as client socket list). The server may send messages to clients that are members of the group account. The display on the client mobile device may include an input area (e.g., input box) and a display area. The user may enter a message (e.g., input information) in the input area. For example, the user may enter a message in the input box using a keyboard or mouse. The client may then generate a message based on the input information and a protocol for message transmission and processing between the client and the server, and then send the message to the server. When the server receives the message, the server may parse the message, in order to obtain the input information, identify the client that sent the message, and determine the group account to which the client belongs.

The server may examine the message (e.g., input information) to determine whether the input information is legal and valid (e.g., whether the input information includes a virus, or whether it is a phishing attempt or contains advertising links, etc.). If the input information is legal and valid, the system may generate a group chat message based on the input information and a protocol for message transmission and processing between the client and the server, and then send the group chat message to all clients in a client list of the group account. After receiving the group chat message, a client may parse the input information from the group chat message and display the input information on the display area of the client. In this manner all members of the group can see the messages from all members and participate in the group chat. The disclosure below describes a system that allows a user to conveniently and efficiently chat privately with another user within the group chat.

Exemplary Computing System for Providing Private Chat Within Group Chat

Figure 1:
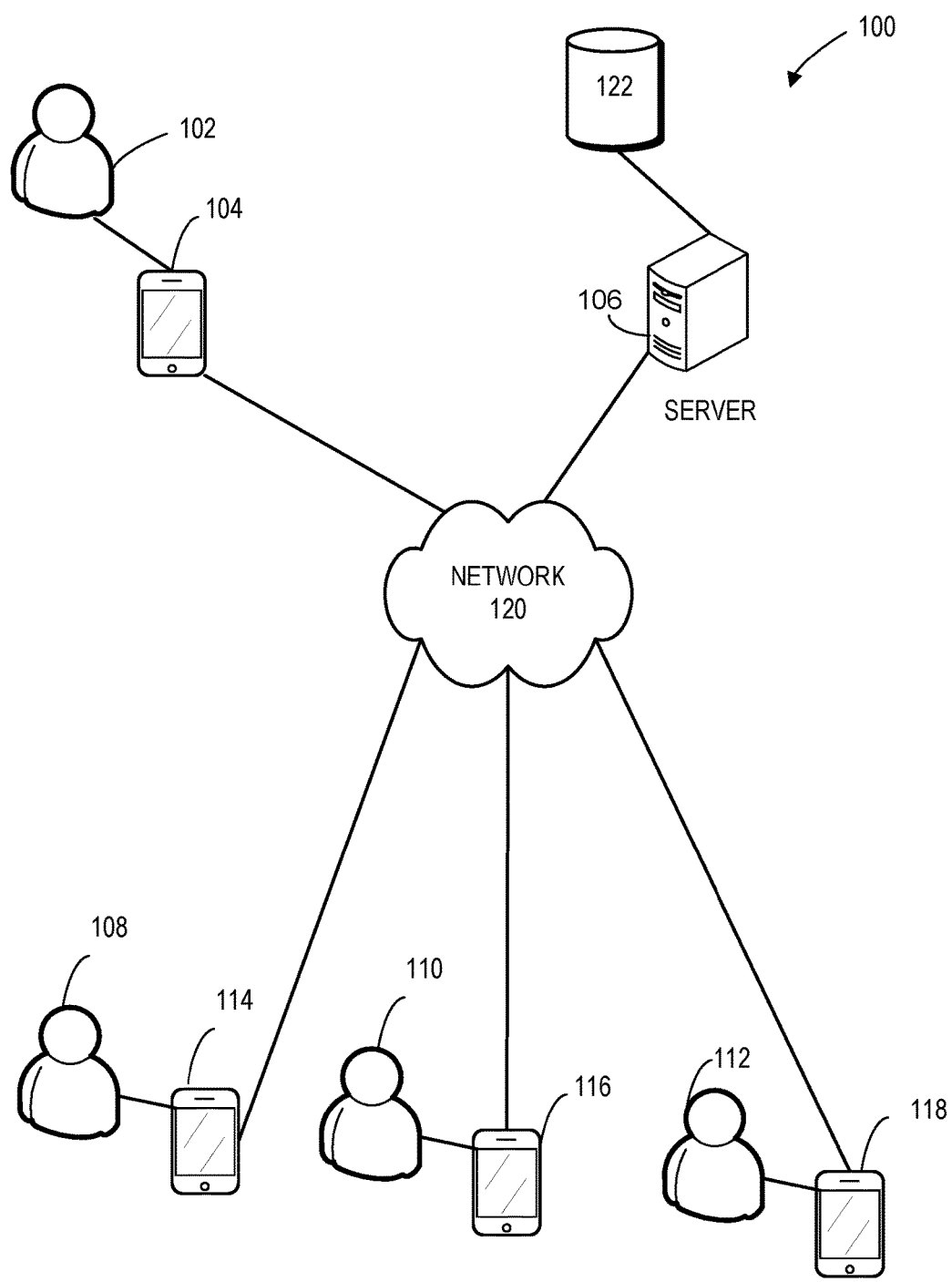
FIG. 1 presents a diagram illustrating an exemplary computing system for providing private chat within a group chat, in accordance with an embodiment of the present invention.

FIG. 1 presents a diagram illustrating an exemplary computing system 100 for providing private chat within a group chat, in accordance with an embodiment of the present invention. As illustrated in FIG. 1, a user 102 may be operating a computing device 104 that includes installed modules for providing private chat within a group chat. The computing device may be a mobile device such as a mobile phone, a tablet, or a laptop, a desktop computer, or any other type of computing device. The modules may include, for example, a receiving module, a message generator module, a sending module, a display module, and a reply module.

The receiving module may receive an input message from the user. The message generator module may generate a first message that includes a first private chat identifier, private chat counterpart information, and private chat content data. The sending module may send the first message to a server 106. Server 106 may use the first private chat identifier and private chat counterpart information to determine a private chat counterpart client. Server 106 may generate a private chat message based on the first message and send the private chat message only to the private chat counterpart client.

The display module may display a message received from server 106 in a display area. The message may include a group chat message and a private chat message. The private chat message may include a second private chat identifier. The client may determine that the message received is a private chat message based on the second private chat identifier, and display the group chat message and private chat message in different ways.

The reply module may add a private chat message reply area to a private chat message display box of a display area. The reply module may receive a private chat message reply entered by the user through the private chat message reply area. The reply module may also automatically add a first private chat identifier and private chat counterpart information to the private chat message reply before sending the private chat message reply to server 106.

User 102 may be participating in the group chat with other users, such as users 108-112. Each of the users may also have a respective mobile computing device 114-118. Each user uses a respective computing device to participate in the group chat.

Server 106 may be hosting the group chat and communicating with the client computing devices over a network 120. Server 106 may include a storage 122 for storing chat messages and code for the modules. Server 106 may also have installed modules such as a receiving module, a private chat client determining module, a private chat message generating module, a directed client counterpart module, a directed message generating module, and a sending module.

The receiving module may receive a first message from a client such as computing device 104. The first message may include a first private chat identifier, private chat counterpart information, and private chat content data, when the receiving module is included in a system that uses group chat for communication between clients. In some embodiments, the receiving module may also receive a first directed identifier, directed counterpart information, and publishing content information as input information from the client, when the receiving module is included in a system that allows multiple fans to follow a user. Note that some systems can support both types of communication methods.

The private chat client determining module may determine a private chat counterpart client based on the first private chat identifier and private chat counterpart information. The private chat message generating module may generate a private chat message based on the private chat content data.

The directed client counterpart module may determine a directed counterpart publishing client based on the first directed identifier and directed counterpart information. The directed message generating module may generate a directed message based on the input information received from the client.

The sending module may send the private chat message only to the private chat counterpart client. In some embodiments, the sending module may send the directed message only to the directed counterpart publishing client.

In some embodiments, the group chat can also operate under a peer-to-peer infrastructure, which may involve one or more computing devices acting as a server for other computing devices or distributing the roles of the server over multiple computing devices.

In some embodiments, a local computer system sends a request to a remote memory location of a remote server to transfer executable instructions and/or data from the remote server. The request may include configuration information for the local computer system. The server can generate code that provides for private chat within a group chat based on the configuration information and send the code to the client machine. The local computer system may also download (e.g., automatically or otherwise) from the remote server the most up-to-date executable instructions that provides for private chat within a group chat on the local computer. The remote server may generate and/or customize the instructions for the local computer system to download. The executable instructions can automatically modify the client machine to enable private chat within group chat.

In some embodiments, a client can send a request for executable code that allows private chat within group chat from another client that another user is using to participate in the group chat with the client. The client can receive the executable code and then install the executable code to enable private chat within the group chat.

Exemplary Process for Client Providing Private Chat Within Group Chat

Figure 2:
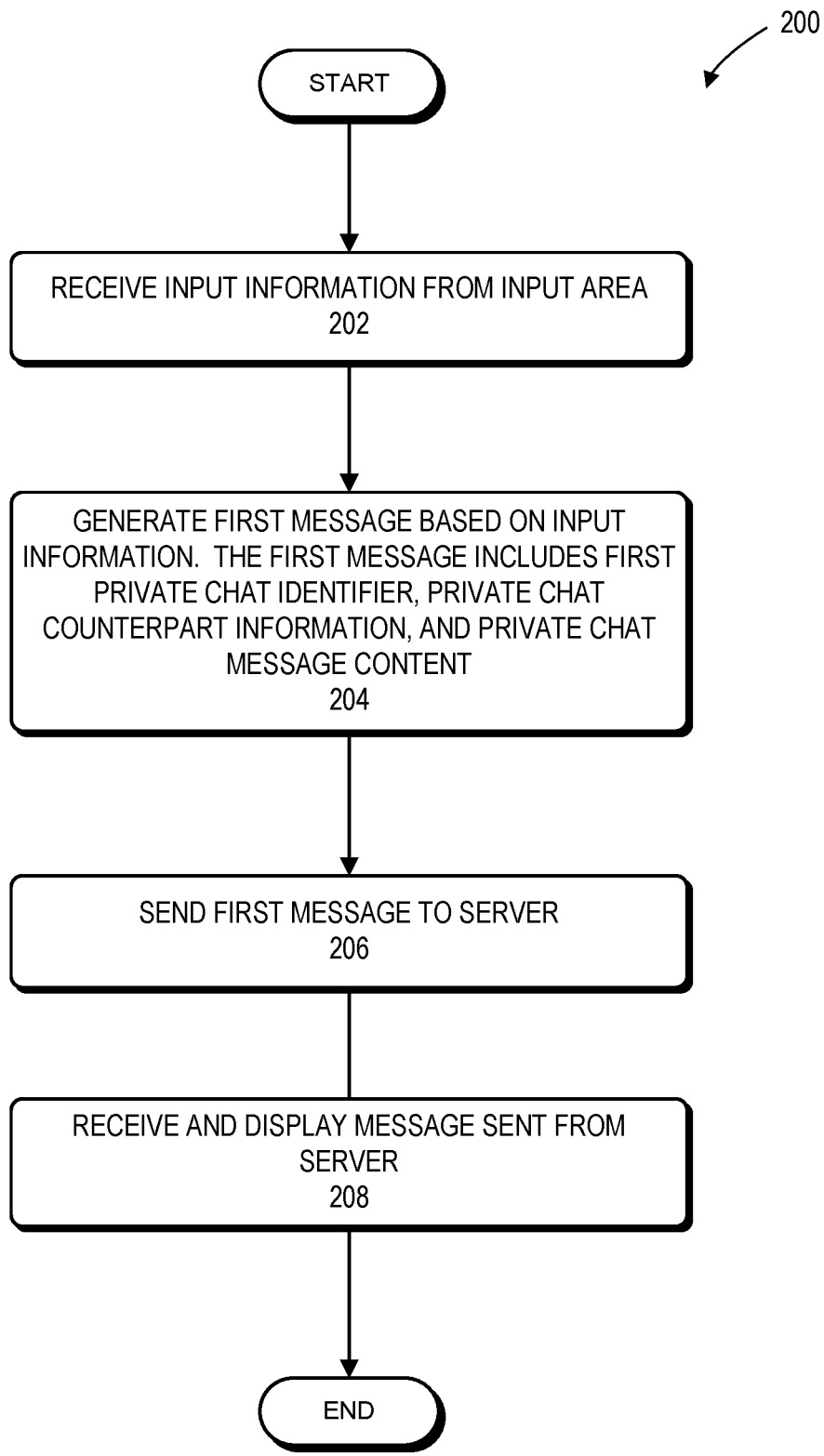
FIG. 2 presents a flowchart illustrating an exemplary process for a client to provide private chat within a group chat, in accordance with an embodiment of the present invention.

FIG. 2 presents a flowchart illustrating an exemplary process for a client to provide private chat within a group chat, in accordance with an embodiment of the present invention. The client (e.g., mobile device) may initially receive input information from an input area on the mobile device (operation 202). The mobile device may then generate a first message based on the input information (operation 204). The first message may include a first private chat identifier, private chat counterpart information, and private chat content data. This information allows a server to determine a private chat counterpart client using the first private chat identifier and private chat counterpart information, generate a private chat message based on the first message, and send the private chat message only to the mobile device of the private chat counterpart client.

The mobile device may send the first message to the server (operation 206). The mobile device may subsequently receive and display a message sent from the server (operation 208).

The system may predetermine the first private chat identifier and the protocol for message transmission and processing between the client and server. The protocol includes the format of the first message and the private chat message. In addition, the system may determine the input format in the input area. The system may also predetermine the characters that the user initially enters in order to initiate the private chat within a group chat. For example, the first private chat identifier may be a "+" or "−" identifier. That is, the user enters "+" or "−" as the first character in the input area to initiate private chat mode in group chat. The message entered by the user will then be a private chat message.

After entering the first private chat identifier, the user can enter private chat counterpart information, such as an account number or name of the private chat counterpart. There can be one or more private chat counterparts. If there are multiple private chat counterparts, the account number or name of the private chat counterparts are separated by pre-defined characters (e.g., such as comma). Subsequently, the user can enter the information to be sent to the private chat counterpart, e.g., the private chat message. The private chat message and the account number or name of the private chat counterpart can also be separated by pre-defined characters (e.g., such as space). For example, if the user enters "+John Smith, James, Mary Hello!" in the input area, the client will receive the character string "+John Smith, James, Mary Hello!". This character string conforms to the predetermined format of the first message in an exemplary embodiment.

The first character the user enters is the first private chat identifier. The user enters the first private chat identifier before entering private chat counterpart information, and the user can use commas to separate the names (also in character string form) of multiple private chat counterparts. The user enters the private chat message after the private chat counterpart information, and a character string of chat content is separated from the name of the private chat counterpart by a space. The client sends the character string to the server. Note that the above embodiment is only one example, and embodiments of the present invention are not limited to the described format of the first private chat identifier and the described format of the first message. The first private chat identifier can have other formats and the first message can have different formats in different embodiments.

After receiving the first message from the client, the server may parse the first message based on a predetermined protocol for message transmission and processing. The server may extract the first private chat identifier and private chat counterpart information. For example, the server may extract one of "+" or "−" (e.g., the first private chat identifier) by parsing the first character of the first message and the name of each private chat counterpart. That is, the system can extract "John Smith", "James" and "Mary" by parsing the character string before the space and after the first private chat identifier of the first message, with commas separating the names. The system can extract the private chat content "Hello" by parsing the character string after the space.

When the server receives the first message from the client, the server may determine the group account to which the client belongs, based on the information associated with the client (e.g., such as client socket information). The system may then determine the private chat counterpart client based on the first private chat identifier and the private chat counterpart information, and generate a private chat message based on the first message. The server may generate the private chat message based on the private chat content data of the first message, or the private chat counterpart information and private chat content data of the first message. The server sends the private chat message only to the private chat counterpart client. Receiving the first message and sending the private chat message only to the private chat counterpart client is described in greater detail below.

The client sending the first message (e.g., the client initiating a private chat) and the private chat counterpart client may receive the private chat message from the server, while the other clients that are also members in the group chat will not receive the message. All clients in the group can receive group chat messages. The client can display the received group message and private chat message in the display area.

If the server generates the private chat message based on the private chat counterpart information and private chat content data, a client receiving the private chat message can display the private chat message and the private chat counterpart information simultaneously, such as the name or identification of a private chat counterpart. That is, the client can display the private chat message while displaying information regarding the members participating in the private chat, e.g., the members being invited to participate in the private chat by the user who initiates the private chat. The client may also display the private chat message without private chat counterpart information and with only private chat content data.

If the server generates the private chat message based on the private chat content data, the client may display only the private chat content data. Whether the client displays private chat counterpart information can be determined by group privilege, user privilege or user requirements considered at the client development stage. For example, a group may be a secret group and a user can be responsible for assigning tasks to several members in the group via private chat, but the members must not know of the other members participating in the tasks. In this scenario, a client may display only private chat content data after receiving the private chat message, and the server may also generate the private chat message only based on private chat content data. Note that the client may also automatically display the sources of group chat messages and private chat messages.

Exemplary Process for Client Providing Private Chat Within Group Chat

Figure 3:
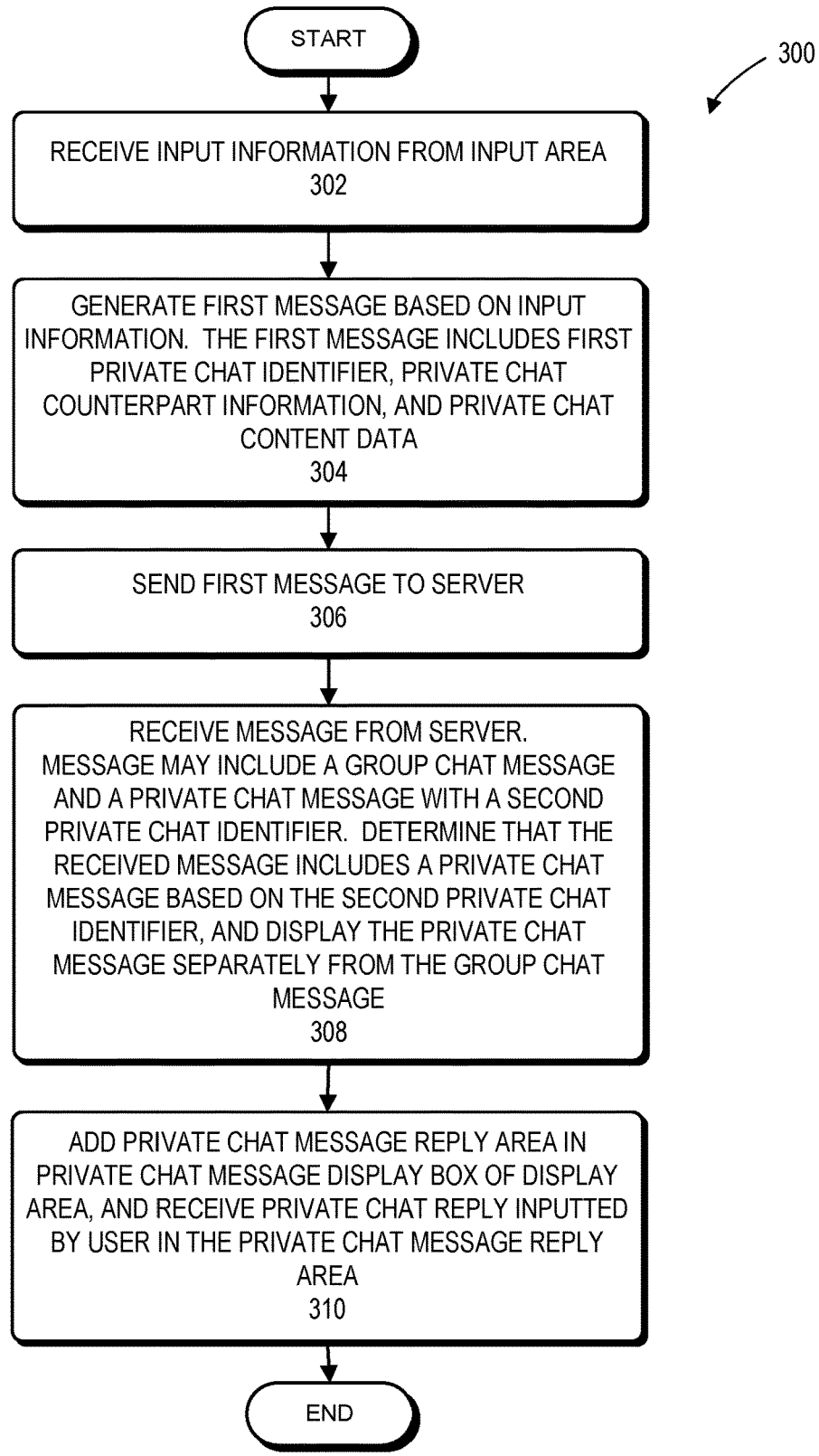
FIG. 3 presents a flowchart illustrating another exemplary process for a client to provide private chat within a group chat, in accordance with an embodiment of the present invention.

FIG. 3 presents a flowchart illustrating another exemplary process for a client to provide private chat within a group chat, in accordance with an embodiment of the present invention. During operation, the system (e.g., a client mobile device) may receive input information from an input area (operation 302).

The client may then generate a first message based on the input information (operation 304). The first message may include a first private chat identifier, private chat counterpart information, and private chat content data. A server may determine a private chat counterpart client based on the first private chat identifier and the private chat counterpart information. The server may then generate a private chat message based on the first message, and send the private chat message only to the private chat counterpart client.

The client may then send the first message to the server (operation 306). The client may receive a message sent by the server and display the message in the display area (operation 308). The message sent by the server may include a group chat message and a private chat message, and the private chat message may include a second private chat identifier. The client may determine that the received message includes a private chat message based on the second private chat identifier, and display the group chat message and private chat message separately.

The client may add a private chat message reply area in the private chat message display box of the display area, and receive a private chat reply inputted by the user in the private chat message reply area (operation 310). After receiving the private chat reply, the client may automatically add the first private chat identifier and the private chat counterpart information to the information inputted by the user.

Note that operations 302 and 306 correspond to operations 202 and 206. The system may predetermine the first private chat identifier and the second private chat identifier, and the system may also predetermine the protocol for message transmission and processing between the client and server. The protocol may specify the format of the first message and the format of the private chat message.

In operation 308, the client may parse all group chat messages and private chat content data according to predetermined rules. For example, the first two characters of a parsed message may include a second private chat identifier that indicates a received message is a private chat message. For example, assume that the system uses the character "s" as a predetermined second private chat identifier and white space as a separator character for private chat content data. The client may parse a received message and the first two characters are "s" and white space. The character "s" is the second private chat identifier, and the client may determine that the received message is a private chat message based on the second private chat identifier. If the client fails to parse and obtain the second private chat identifier, the client may determine that the received message is a group chat message. Note that the second private chat identifier can be the same as first private chat identifier.

The client can separately display a received group message and a received private chat message in the display area. For example, the client may add distinctive symbols, such as a "Private Message" identifier, in the display box for a private chat message, so that the user can clearly distinguish a group chat message from a private chat message.

When the server generates a private chat message based on private chat counterpart information and private chat content data, and the client is displaying the private chat message, the client can at the same time display private chat counterpart information (e.g., such as name or identification of private chat counterpart). That is, the client can simultaneously display a private chat message and members participating in a private chat. These members are invited to participate in a private chat by the user who initiates the private chat. The client can also, at the time of displaying the private chat message, not display private chat counterpart information, and only display private chat content data.

When the server generates a private chat message based on private chat content data, the client displays the private chat content data. Whether the client displays private chat counterpart information is determined by group privilege, user privilege or user requirements during the development of client (e.g., client software). For example, if the group is a secret group, the user may be a group task dispatcher that dispatches a task to several members from the group via private chat. A member participating in the task must not know of other members participating in the task. In this case, after receiving a private chat message the client only displays private chat content data, and the server generates a private chat message based only on the private chat content data.

If the user wants to have a private chat with one or more members, the user can enter his input in the input area according to predetermined rules. For example, a user may enter "+John Smith, James, Mary Hello". The user may want to reply to a private chat message sent by other members after seeing the private chat message in the display area of the client. For example, David Smith may initiate a private chat to John Smith, James and Mary by entering "+John Smith, James, Mary Hello" in the input area and sending the input data.

If John Smith wants to reply to the private chat message after seeing the private chat message from David Smith on his client mobile device, there are three possible scenarios: 1. John Smith only replies to David Smith; 2. John Smith replies to any one of David Smith, James and Mary; and 3. John Smith replies to all members participating in the private chat, e.g., David Smith, James and Mary.

Regarding scenarios 1 and 2, John Smith can enter the reply message in the input area according to input rules for replying to a message. For example, John Smith can input "+David Smith Hello!" or "+David Smith, James Hello". Regarding scenario 3, John Smith can also input the reply message according to input rules for replying to a message. For example, John Smith may enter "+David Smith, James, Mary Hello!".

The reply method in scenario 3 is most commonly used by the user participating in a chat (e.g., reply to all). However, if the user needs to enter the private chat identifier and private chat counterpart information for each reply, the private chat process can be complicated and inefficient. Therefore, in one embodiment, operation 310 includes that the private chat message display box for the client includes a private chat message reply area. For example, the client may add a reply button or reply link in the display box for the private chat message so that the user can click the reply button or reply link to reply to the private chat message.

When the client receives the user's reply to the private chat message in the private chat reply area, such as receiving the user's input clicking on the reply button or reply link, the client may automatically add the first private chat identifier and the private chat counterpart information. The client may insert and display the first private chat identifier and private chat counterpart information (e.g., name or identification of private chat counterpart) in the input area, such as in an input box. Alternatively, the client may insert and display a private chat reply indicator, such as the character string "Reply to Private Chat". The user only needs to enter the private chat content after the first private chat identifier and private chat counterpart information or after the private chat reply indicator.

If the client inserts the first private chat identifier and private chat counterpart information in the input area, the input information received by the client from the input area already includes the automatically added first private chat identifier and private chat counterpart information. If the client inserts the private chat reply indicator in the input area, the client may automatically add the first private chat identifier and private chat counterpart information to the input information after receiving the input information (e.g., private chat content) from the input area.

Thus, the user is only required to perform a simple operation to reply to the private chat message. For example, the user need only click on the reply button for the private chat message and then enter the reply content. The user is not required to enter the first private chat identifier and private chat counterpart information every time, especially when many members participate in a private chat. As a result, this scheme helps to significantly improve the efficiency of the user's private chat and user experience.

The private chat counterpart information may include the information of all members participating in a private chat (e.g., including the private chat initiating party). The client may display the message sent by the user. The client may automatically add private chat counterpart information in operation 310. That is, the client adds the information of all members participating in a private chat. The server may send the group chat message or private chat message to the client after receiving the group chat message or private chat message sent by the client. The server may also send the message that the client sends for a reply to a private chat back to the client, and the client may display the message.

Exemplary Process for Server Providing Private Chat Within Group Chat

Figure 4:
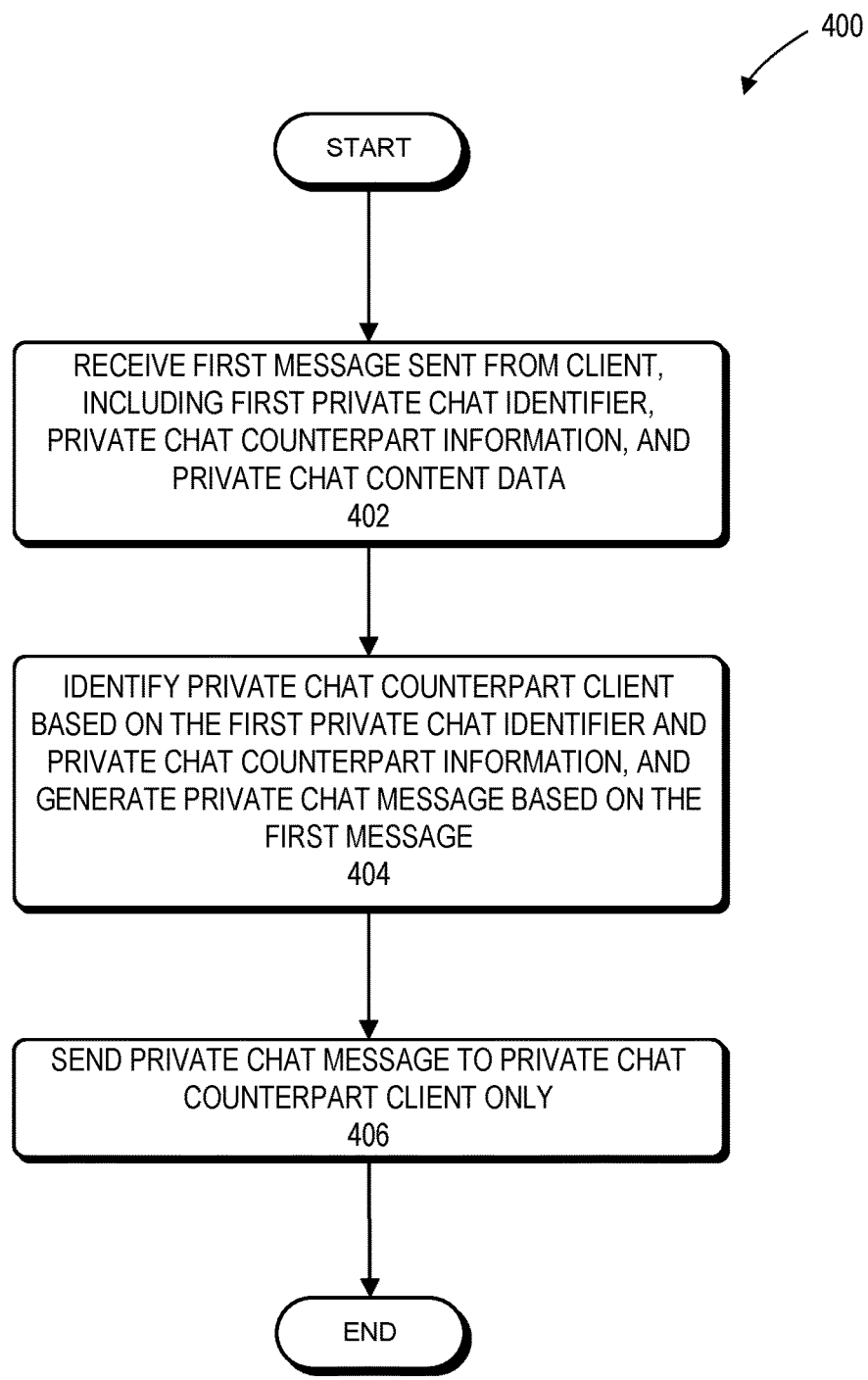
FIG. 4 presents a flowchart illustrating another exemplary process for a server to provide private chat within a group chat, in accordance with an embodiment of the present invention.

FIG. 4 presents a flowchart illustrating another exemplary process for a server to provide private chat within a group chat, in accordance with an embodiment of the present invention. During operation, the server may receive a first message sent by the client, and the first message may include a first private chat identifier, private chat counterpart information, and private chat content data. The server may parse the first message to obtain the first private chat identifier, private chat counterpart information and private chat content data.

The server may then identify the private chat counterpart client based on the first private chat identifier and private chat counterpart information, and generate a private chat message based on the first message (operation 404).

The server may then send the private chat message to the private chat counterpart client only (operation 406).

If the server parses the message sent by the client according to a predetermined protocol for message transmission and processing, and the server fails to obtain the first private chat identifier, the system may determine that the message sent by the client is a message sent in group chat mode. If the server parses the message sent by the client, and the server obtains the first private chat identifier, the server may determine that the message sent by the client is a message sent in private chat mode.

After the server receives a first message, the server can determine the group account to which a client belongs based on information of the client sending the first message (e.g., such as a client socket). The server can then determine a private chat counterpart client based on the first private chat identifier and private chat counterpart information. If the first private chat identifier is a selection identifier, the client corresponding to the private chat counterpart information is a private chat counterpart client. The private chat counterpart information after the selection identifier is information regarding counterparts that the user selected to participate in a private chat, and the server may determine that a client corresponding to the private chat counterpart information is a private chat counterpart client. For example, the character "+" can be the first private chat identifier and selection identifier. If the user "David Smith" enters the character string "+John Smith, James, Mary Hello!", the names of the private chat counterparts are "John Smith", "James" and "Mary". The server may parse the names of the private chat counterparts and determine that the corresponding client devices of "John Smith", "James" "Mary" and "David Smith" are the private chat counterpart clients. The server may then send the private chat message to the private chat counterpart clients. The message sent by the client may also be sent back to the client by the server and displayed on the client. That is, the server sending a private chat message may also include the client as a private chat counterpart client. For example, the client used by "David Smith" is also a private chat counterpart client.

If the first private chat identifier is an exclusion identifier, the clients corresponding to private chat counterpart information are excluded from a client list, and the remaining clients are private chat counterpart clients. That is, the private chat counterpart information after the exclusion identifier is information regarding private chat counterparts excluded from the group. For example, the character "−" can be the first private chat identifier and exclusion identifier. If the user "David Smith" enters the character string "−John Smith, James, Mary Hello!" then the names of the excluded private chat counterparts are "John Smith", "James", and "Mary". After the server parses the names of the private chat counterparts, the server may determine that "John Smith", "James", and "Mary" are members excluded from the group. The server may exclude the clients responding to "John Smith", "James" and "Mary" from the client list. The server may determine that other clients, including the client associated with "David Smith", are private chat counterpart clients, and the server may send private chat messages to the private chat counterpart clients.

The server may generate a private chat message based on the first message. The server can generate the private chat message based on only the private chat content data of the first message, or the server can generate the private chat message based on both the private chat counterpart information and the private chat content data. If the server generates the private message based on private chat counterpart information and private chat content data, the client can simultaneously display the private chat message and private chat counterpart information, such as the private chat counterpart name or identification. When the client displays the private chat message, the client can also at the same time display information regarding members that are participating in the private chat. When displaying the private chat message the client can also not display private chat counterpart information and only display private chat content data. If the server generates the private chat message based on only private chat content data, the client may only display private chat content data. Whether the client displays private chat counterpart information or not can be determined by group privilege, user privilege or user requirements during development of the client device (e.g., such as during messaging software development).

In one embodiment, the server generates a private chat message that includes a second private chat identifier, so that the client can determine whether a received message is a private chat message based on the second private chat identifier. That is, the server inserts the second private chat identifier into a generated private chat message. In addition, the private chat message format and the position of the second private chat identifier in the private chat message is predetermined. For example, the server may add the character string "*secret*" into the private chat message as a second private chat identifier, and the second private chat identifier is located at the beginning of the private chat message. After the client receives the private chat message, the client parses the private chat message and obtains the character string "*secret*". The client may determine that the received message is a private chat message, so that the client can display the group chat message and the private chat message in a distinctive manner.

In some embodiments, the client need not generate an additional chat window. Private chat is available in the original group chat window, and the user need not switch among multiple chat windows. The user need only use the group chat window to participate in both group chat and private chat, which provides the user with improved communication efficiency and user experience.

Exemplary Process for Client Providing Private Chat Within Group Chat

Figure 5:
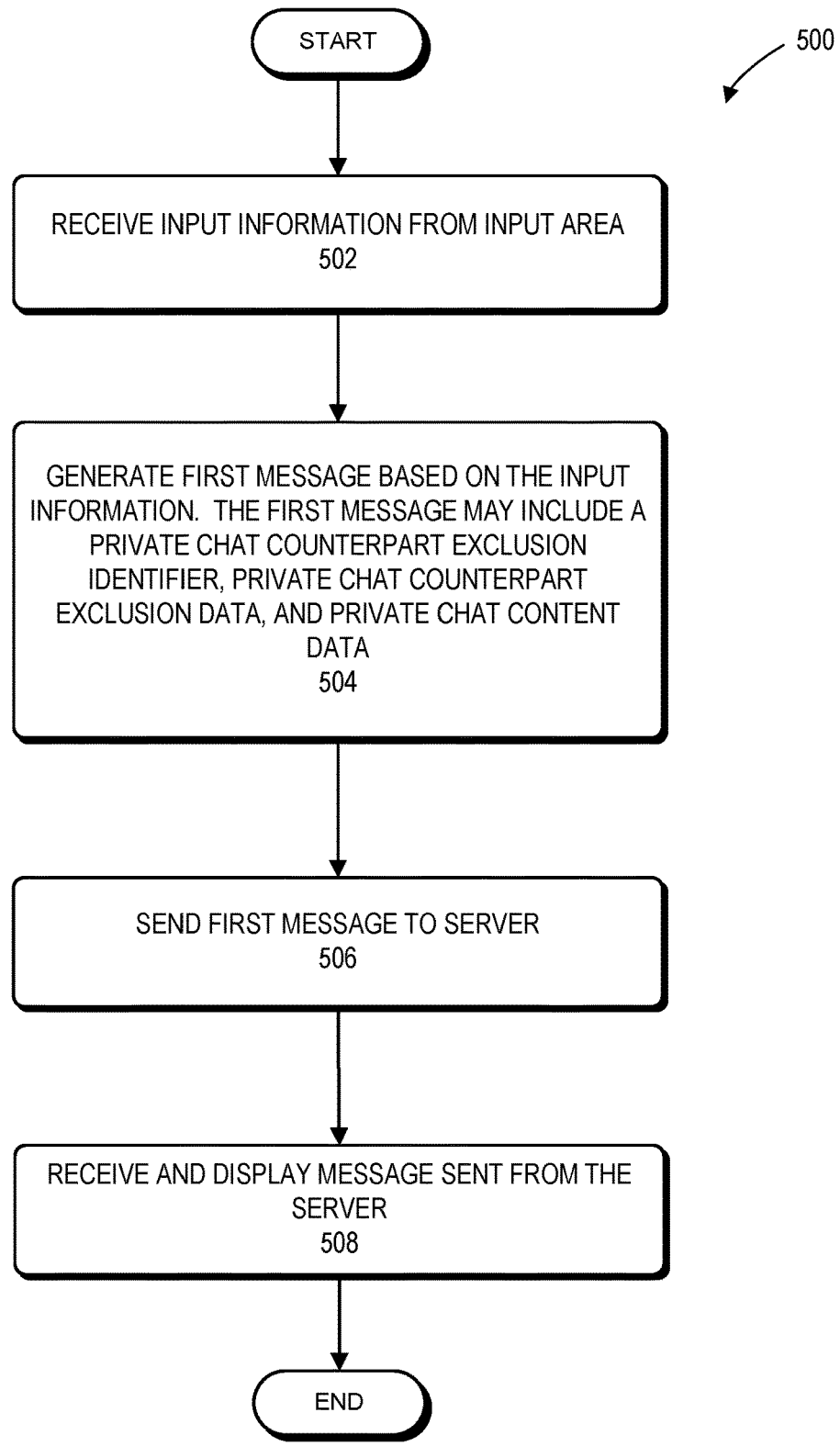
FIG. 5 presents a flowchart illustrating another exemplary process for a client to provide private chat within a group chat, in accordance with an embodiment of the present invention.

FIG. 5 presents a flowchart illustrating another exemplary process for a client to provide private chat within a group chat, in accordance with an embodiment of the present invention. During operation, a client may receive input information from an input area (operation 502). The client may generate a first message based on the input information. The first message includes a private chat counterpart exclusion identifier, private chat counterpart exclusion data, and private chat content data. The information in the first message allows a server to determine a private chat counterpart client based on the private chat counterpart exclusion identifier and private chat counterpart exclusion data. The server may generate a private chat message based on the first message, and send the private chat message only to the private chat counterpart client.

The client may send the first message to the server (operation 506). The client may then receive and display the message sent by the server (operation 508).

The system may predetermine the private chat counterpart exclusion identifier and protocol for the transmission and processing of messages between client and server. The protocol includes the format of the first message and the format of the private chat message. The private chat counterpart exclusion identifier indicates that the first message entered by the client is a private message and that the group members corresponding to the private chat counterpart exclusion data are those that the client does not intend to conduct private chat with. In addition, the system may predetermine the format for entering a message in the input area for the first time by the client initiating the private chat when conducting a private chat. For example, when the system uses "-" as the private chat counterpart exclusion identifier in the first position of input information, once the first character entered by the client in the input area is "-", that will initiate private chat mode in group chat. The client needs to enter private chat counterpart exclusion data after the private chat counterpart exclusion identifier, such as the account number or name of the private chat counterpart being excluded. One or more private chat counterparts can be excluded. Then the user can enter the information that is intended to be sent to the private chat counterpart, e.g., private chat content data. The private chat counterpart exclusion identifier may also be in other formats, and the first message can also be in other formats.

After receiving the first message sent by the client, based on a predetermined protocol for message transmission and processing, the server parses the first message and obtains the private chat counterpart exclusion identifier, private chat counterpart exclusion data, and private chat content data. The server may determine, based on the private chat counterpart exclusion identifier, that the client sent the first message under a private chat mode. The server may then remove from a clients list the clients corresponding to the private chat counterpart exclusion data. The remaining clients are private chat counterpart clients, and the server generates a private chat message based on the first message. The server can generate the private chat message from the private chat content data of the first message. Also, the server can generate the private chat message from the private chat counterpart exclusion data and the private chat content data of the first message, and send the private chat message to the private chat counterpart clients.

The server may send messages that include group chat messages and private chat messages. The client sending the first message, e.g., the client initiating the private chat, and clients of private chat counterparts may receive a private chat message sent by the server, while clients of group members corresponding to counterpart exclusion data may not receive the message. The client may receive and display group chat messages and private chat messages. In one embodiment, the server generates a private chat message without any special processing. That is, there is no difference in processing and format for the private chat messages and group chat messages, and there is no difference in the client's display of private chat messages and group chat messages.

In some embodiments, the server generates a private chat message that includes a second private chat identifier. That is, the server adds a second private chat identifier when generating the private message. The system may predetermine the second private chat identifier. The client parses all group chat messages and private chat messages received according to predetermined rules. For instance, the client may parse the first character of a message. If the client obtains a second private chat identifier from parsing the message, then the client may determine that the received message is a private message. If the client does not obtain a private chat counterpart exclusion identifier from parsing the message, then the client may determine that the received message is a group message. The client displays both the group chat messages and private chat messages in the display area in different ways, enabling the user to distinguish between group chat messages and private chat messages. When the server generates a private chat message based on both private chat counterpart information and private chat content data, the client can display the private chat counterpart information when displaying the private chat message.

In an embodiment, the client may add a private chat message reply area in the private chat message display box of the display area, and receive a user's private chat message reply from the private chat message reply area. When receiving a user's private chat message reply, the client may automatically add the private chat counterpart exclusion identifier and the private chat counterpart exclusion data to the input data (e.g., private chat message reply).

The client may add the private chat message reply area in the private chat message display box of the display area, enabling the user to reply to a private chat message by clicking on a reply button or reply link. When receiving a private chat message reply from the user in the private chat message reply area, the client may automatically add the private chat counterpart exclusion identifier and the private chat counterpart exclusion data to the input data (e.g., private chat message reply). The user need only perform a simple reply operation and then enter the reply content, thus eliminating the need to enter the private chat counterpart identifier and private chat counterpart information every time.

Exemplary Process for Server Providing Private Chat Within Group Chat

Figure 6:
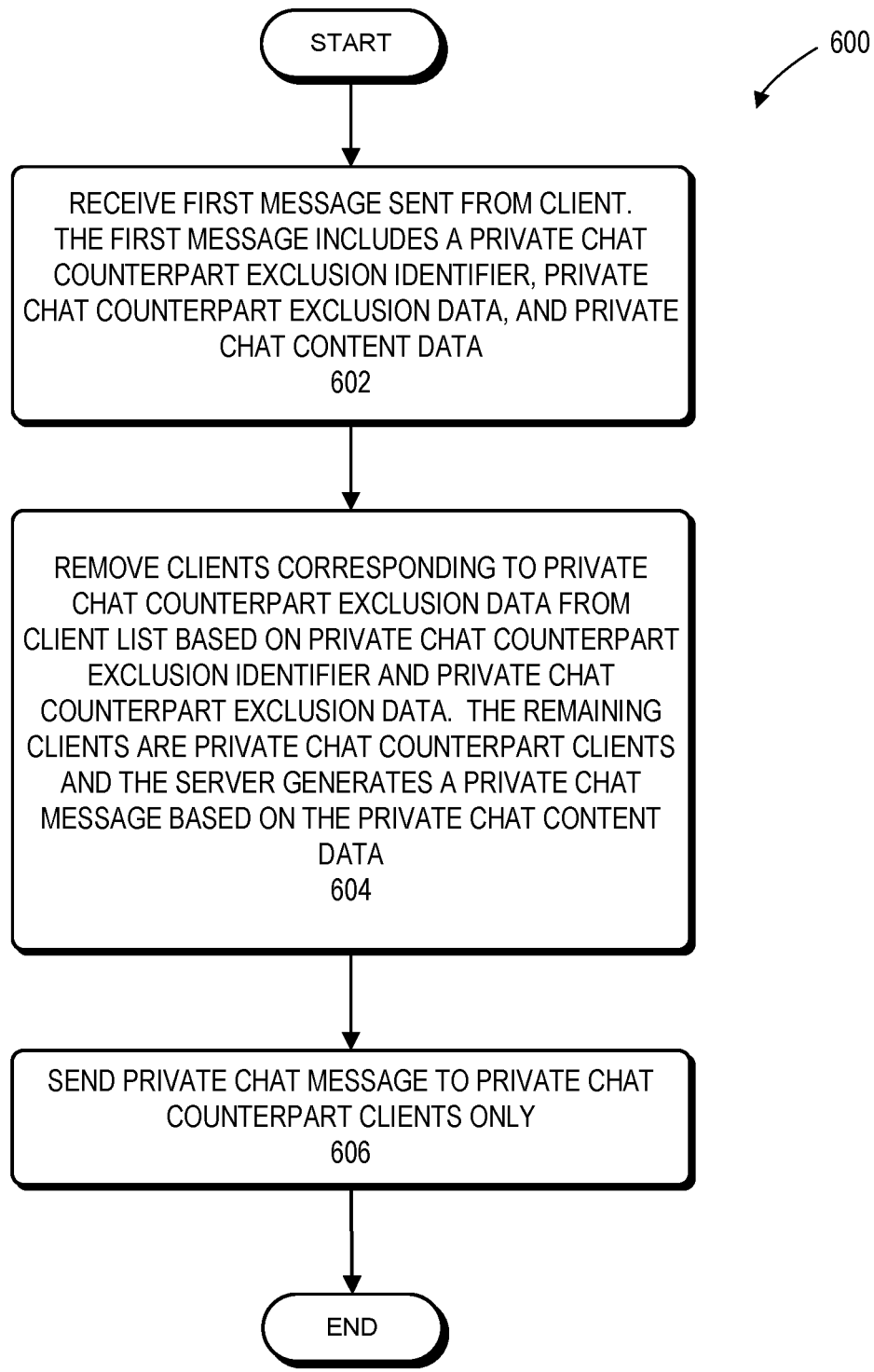
FIG. 6 presents a flowchart illustrating an exemplary process for a server to provide private chat within a group chat, in accordance with an embodiment of the present invention.

FIG. 6 presents a flowchart illustrating an exemplary process for a server to provide private chat within a group chat, in accordance with an embodiment of the present invention. During operation, the server receives a first message sent by a client (operation 602). The first message includes a private chat counterpart exclusion identifier, private chat counterpart exclusion data, and private chat content data.

The server then removes the clients corresponding to the private chat counterpart exclusion data from a client list based on the private chat counterpart exclusion identifier and private chat counterpart exclusion data (operation 604). The remaining clients are private chat counterpart clients and the server generates a private chat message based on the private chat content data. The server then sends the private chat message to the private chat counterpart clients only (operation 606).

When the server parses the message sent by the client according to the predetermined protocol for the transmission and processing of message, if there is no private chat counterpart exclusion identifier, then the server determines that the message sent by the client is a message sent under group chat mode. If the server obtains the private chat counterpart exclusion identifier through parsing of the message sent by the client, then the server determines that the message sent by the client is a message sent under private chat mode.

After the server receives the first message from the client, the server determines which group account the client belongs to based on information regarding the client. The server then removes the clients corresponding to the private chat counterpart exclusion data from the client list of the group account. The remaining clients are private chat counterpart clients, and the server sends a private chat message to the private chat counterpart clients.

The server may generate a private chat message based on the first message. The server can generate the message from only the private chat content data in the first message, or from both the private chat counterpart information and the private chat content data in the first message. If the server generates the private message based on both private chat counterpart information and private chat content data, the client may display both the private chat message and private chat counterpart information. That is, the client displays the private chat message as well as group members participating in the private chat.

In one embodiment, the private chat message includes the second private chat identifier. That is, the server inserts the second private chat identifier when generating a private chat message to enable the client to determine that the message received is a private message. The system can predetermine the format of the private chat message, including the location of the second private chat identifier in the private chat message. After receiving the private chat message, the client parses the private message according to its format. If the client obtains the second private chat identifier, the client may determine that the message is a private message. The second private chat identifier helps the client to distinguish between group messages and private messages, and the client may display group messages and private messages in different ways.

Publishing Clients

With the coming of the media era, people are widely used to using publishing clients (e.g., including clients on personal computers and mobile devices) such as blogs, microblogs (e.g., Weibo), WeChat, and personal websites to publish information and to share and communicate with others. One may register his/her own account on a publishing client so as to have a publishing platform to publish his/her own information. The publishing server is responsible for the maintenance and management of registered accounts and the corresponding publishing client information. At the same time, a user may follow another user's account through his/her own publishing client, read messages published by the other user, and become a fan of the other user.

The process is as follows: when a user uses a publishing client to follow (or un-follow) a certain account, the publishing client sends to a publishing server a corresponding follow (or un-follow), operation information, and information regarding the account being followed (or un-followed). Each account on the publishing server corresponds to a fan account list and a follow account list. A fan account list corresponds to a fans publishing client list, and a follow account list corresponds to a follow publishing client list.

After receiving the follow (or un-follow) operation information and information regarding the followed (or un-followed) account, the publishing server changes the fan account list of the followed (or un-followed) account (e.g., add or delete a certain fan account). The publishing server may also change the fans publishing client list corresponding to the fan account list and the follow publishing client list corresponding to the follow account list. The publishing server may then publish fan change information and follow change information to the publishing client corresponding to the followed account. After receiving the fan change information and follow change information, the publishing client may update the follow number, number of fans, follow account information and/or fan account information displayed on the publishing client. When a user wants to view his/her own fan list on the publishing client, he/she may send to the publishing server a request for review of the fan list. The publishing server may, based on the fan list review request, return to the publishing client all or part of fan account list information (e.g., in case of large number of fans, publishing server may return list information in batches). The publishing client may then receive and display the fan account list information.

When a user publishes a message, he/she enters the message in the input box of the publishing client. After receiving the input information, the publishing client sends the input information to the publishing server. The publishing server forwards the input information to all publishing clients in the fan client list corresponding to the publishing client, so that all fans of the user including other viewers can see the message published by the user through their own publishing clients. In this scenario, the user's published message is public information.

However, sometimes the user does not want his/her message to be seen by all fans and other viewers, but to be seen by only a certain fan or a number of fans. In this scenario, the message is directed information. Presently, directed information may be limited to information directed at good friends (e.g., accounts following each other are good friends). That is, the message can only be seen by users mutually following each other (e.g., friend circles in Weibo and WeChat).

The publishing client may provide options when sending messages such as public information, limited to mutual follow (e.g., mutual follow), and viewable and non-viewable. When a user selects the option of limited to mutual follow, the publishing client sends the message entered in the input box by the user to the publishing server. After the publishing server receives the input information in the message, the publishing server sends the input information to all publishing clients corresponding to a mutual follow account list. The server may determine the mutual follow account list from the fan account list and the follow account list of the publishing client (e.g., the common portions of fan account list and follow account list). Since directed information is limited to sending to all mutual follow accounts, the user cannot direct the input information to specific accounts, regardless whether the accounts are mutual follow accounts.

Exemplary Process of Directed Message Delivery for Publishing Clients

Figure 7:
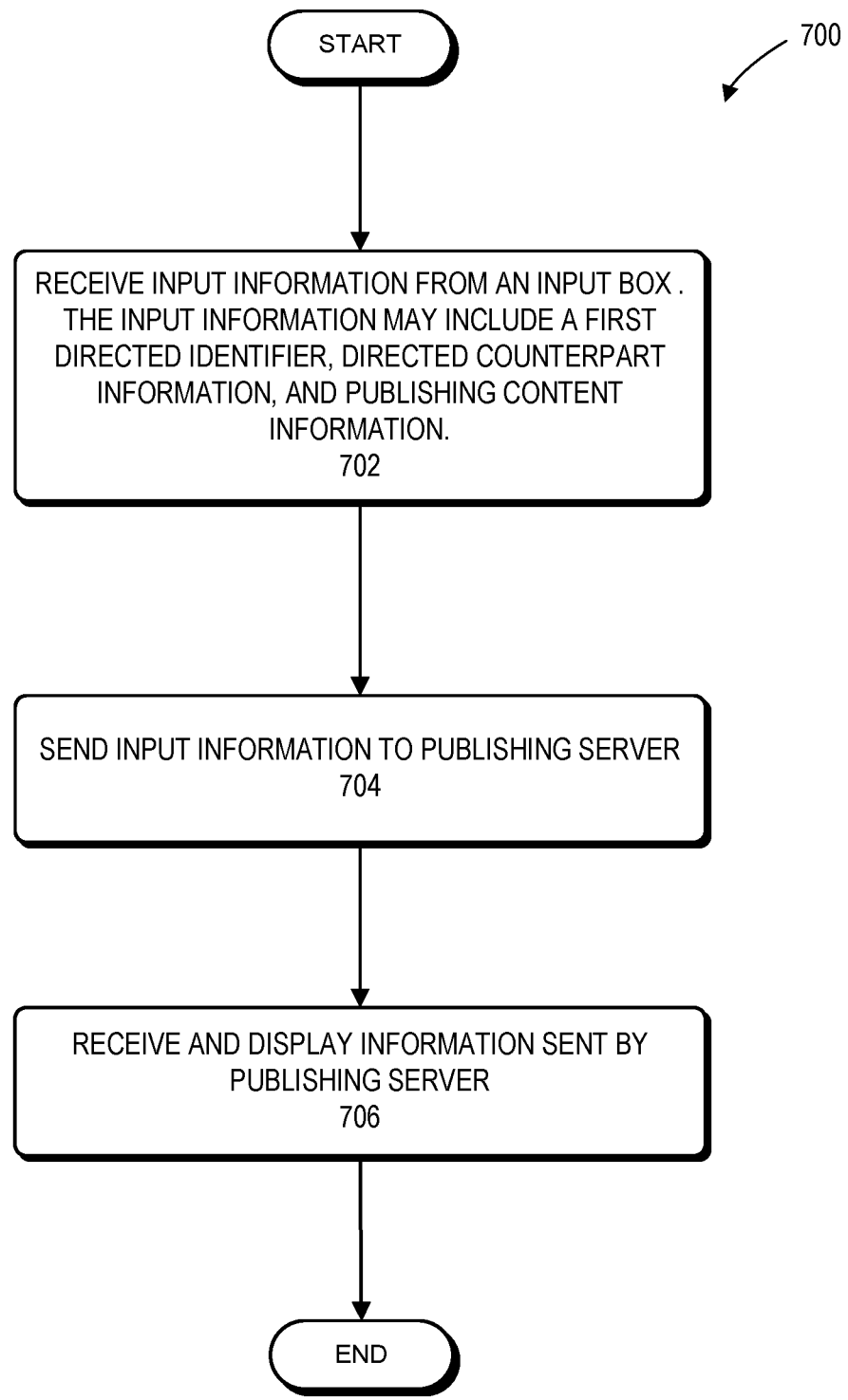
FIG. 7 presents a flowchart illustrating an exemplary process of directed message delivery for publishing clients, in accordance with an embodiment of the present application.

FIG. 7 presents a flowchart illustrating an exemplary process of directed message delivery for publishing clients, in accordance with an embodiment of the present application. During operation, the client receives input information from an input box (operation 702). The input information may include a first directed identifier, directed counterpart information, and publishing content information. The input information allows a server to determine directed counterpart publishing clients based on the first directed identifier and the directed counterpart information, generate directed information based on the input information, and send the directed information to the directed counterpart publishing clients only.

The client may then send the input information to the publishing server (operation 704). The client may receive and display information sent by the publishing server (operation 706).

The system may predetermine the content and format that the user enters in the input box. The system may determine that the content the user enters should include the first directed identifier, directed counterpart information, and publishing content information. For example, the system may use the first character "+" or "−" as the first directed identifier. The system may predetermine the first directed identifier and a second directed identifier, and predetermine a message transferring and message processing protocol between the publishing client and the publishing server.

The user may enter message content in a specified format in an input box. For example, the system may use the first character "+" or "−" as the first directed identifier to select or exclude a fan, respectively. For example, the user may enter "+" or "−" as the first character in the input box, and enter directed counterpart information after the first directed identifier. For example, the user may enter the account number or the user name of the directed counterpart, and then the user may enter publishing content information. The first directed identifier, directed counterpart information, and publishing content information constitute the input information. After receiving the input information, the publishing client may send the input information to the publishing server.

Upon receiving input information sent by the publishing client, the publishing server may parse the input information so as to obtain the first directed identifier, directed counterpart information and publishing content information. Then, the server may determine, based on the first directed identifier, that the received input information is directed information, e.g., the input information is accessible only by the directed counterpart. The server may determine the directed counterpart publishing client according to the first directed identifier and directed counterpart information, and generate directed information based on the input information. The server may send the directed information to the directed counterpart publishing client.

The publishing client and the directed counterpart publishing client may receive the directed information sent by the publishing server, while other clients may not receive such information. The publishing server may send information that includes public information and directed information. The directed information may include the second directed identifier. A client may determine based on the second directed identifier that the received information is directed information, and display the public information and directed information separately. This makes it convenient for users to determine which is public information and which is directed information.

The publishing client may receive directed information and parse the directed information according to predetermined rules. For example, the client may parse the first character of the directed information. If the client determines that the directed information includes the second directed identifier, the client may determine that the received information is directed information. If the client determines that the directed information does not include the second directed identifier, the client may determine that the received information is public information. The publishing client may then separately display the public information and directed information. For example, the publishing client may add a distinguishing symbol such as "directed" in the directed information display box. The publishing server may send message source information to the client that indicates which publishing client the input information corresponding to the message comes from. The publishing client may automatically display information regarding the source of the directed information and the source of the public information.

Exemplary Process of Directed Message Delivery for Server

Figure 8:
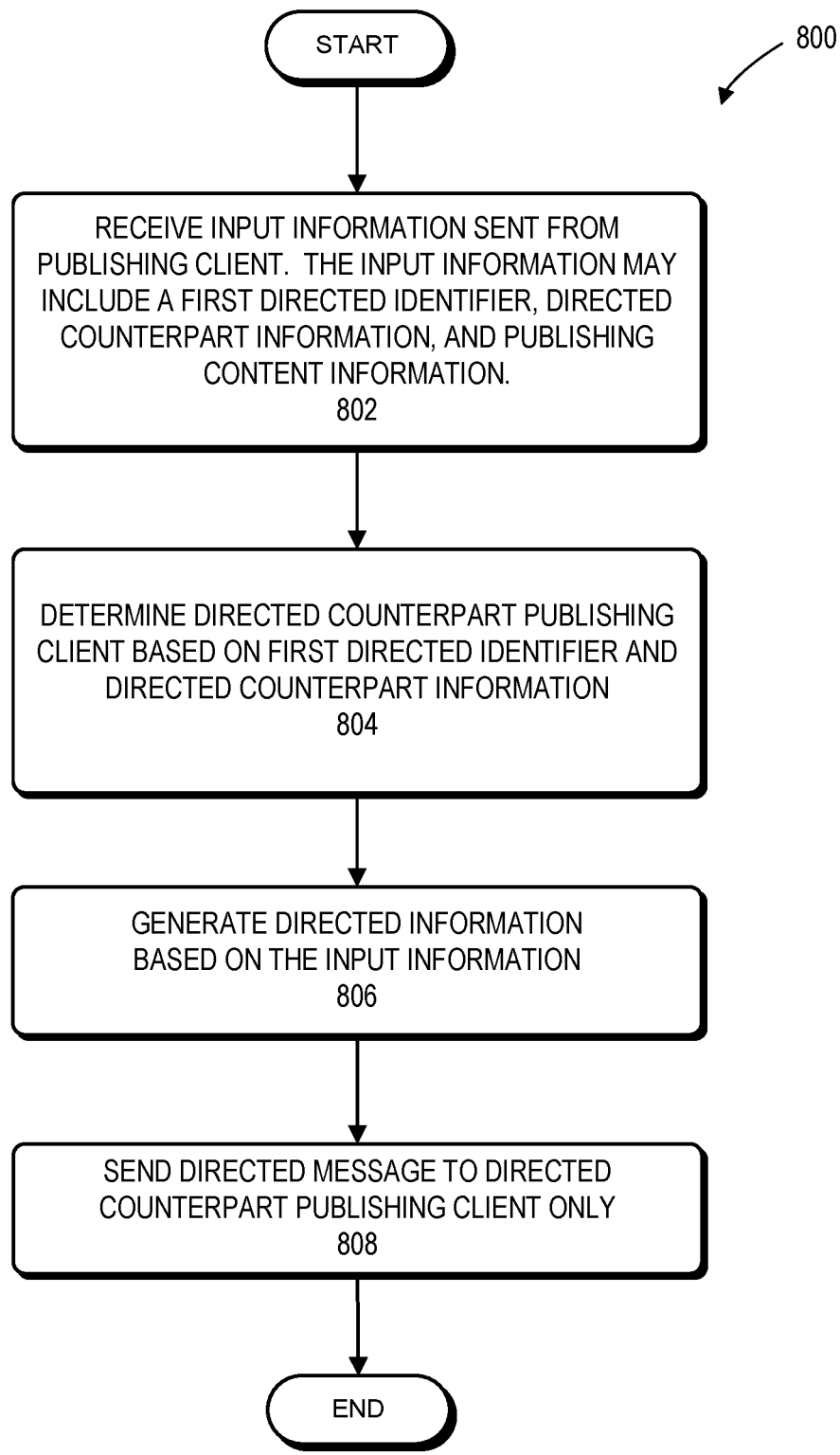
FIG. 8 presents a flowchart illustrating an exemplary process of directed message delivery method for a server, in accordance with an embodiment of the present invention.

FIG. 8 presents a flowchart illustrating an exemplary process of directed message delivery for a server, in accordance with an embodiment of the present invention. During operation, the system may receive input information sent from a publishing client (operation 802). The input information may include a first directed identifier, directed counterpart information, and publishing content information. Next, the system may determine the directed counterpart publishing client based on the first directed identifier and directed counterpart information (operation 804). The system may then generate directed information based on the input information (operation 806). The system may send the directed message to the directed counterpart publishing client only (operation 808). Note that the system can also generate and send directed messages to multiple publishing clients based on the directed counterpart information.

If the publishing server does not obtain the first directed identifier when parsing the input information sent by the publishing client, the server may determine that the input information sent by the publishing client is accessible to all. If the publishing server obtains the first directed identifier when parsing the input information sent by the publishing client, the server may determine that the input information sent by the publishing client is directed input information. For directed input information, the publishing server may parse the input information to obtain the first directed identifier, directed counterpart information and publishing content information.

Upon receiving input information sent by the publishing client, the publishing server may determine that the input information is directed based on the first directed identifier. The publishing server may determine the directed counterpart publishing client based on the first directed identifier and directed counterpart information. When the server receives input information sent by the publishing client, the server may also receive information associated with the publishing client (e.g., socket). If the first directed identifier is a selection identifier, the publishing server may search in the fans publishing client list of the publishing client. The publishing client corresponding to the directed counterpart information is the directed counterpart publishing client. If the first directed identifier is an exclusion identifier, then the system (e.g., publishing server) removes the publishing client corresponding to the directed counterpart information from the fans publishing client list of the publishing client. The remaining publishing clients are the directed counterpart publishing clients. Using an exclusion identifier as the first directed identifier is appropriate for users with few fans. If a user has a large number of fans, the user may need to enter a large amount of directed counterpart information in order to remove non-directed counterparts.

The server may generate directed information based on the input information. The publishing server may send information to the publishing client that includes public information and directed information. In some implementations, the publishing client uses the same format and processing techniques for public information and directed information. The publishing client may therefore manage and display the public information and directed information in the same way. Although users who publish information can include indicators within a message, the user experience associated with the publishing client is inferior with this approach, since users cannot be clear as to which is public information and which is directed information. Therefore, in some embodiments, the publishing server may generate directed information that has a second directed identifier. The publishing client may determine the received information is directed information based on the second directed information, and separate the directed information from public information, so that the publishing client may display public information and directed information in different ways. The system may predetermine the format of the directed information and the position of the second directed identifier in the directed information. Note that the second directed identifier can also be the same as the first directed identifier.

Embodiments of the present invention include a method for directed information publishing. A user has the flexibility to choose a directed counterpart. The user need only enter the first directed identifier and directed counterpart information in an input box to publish directed information. In comparison with the mode which allows only friends who follow each other to publish directed information, this mode is much more convenient.

Exemplary Client

Figure 9:
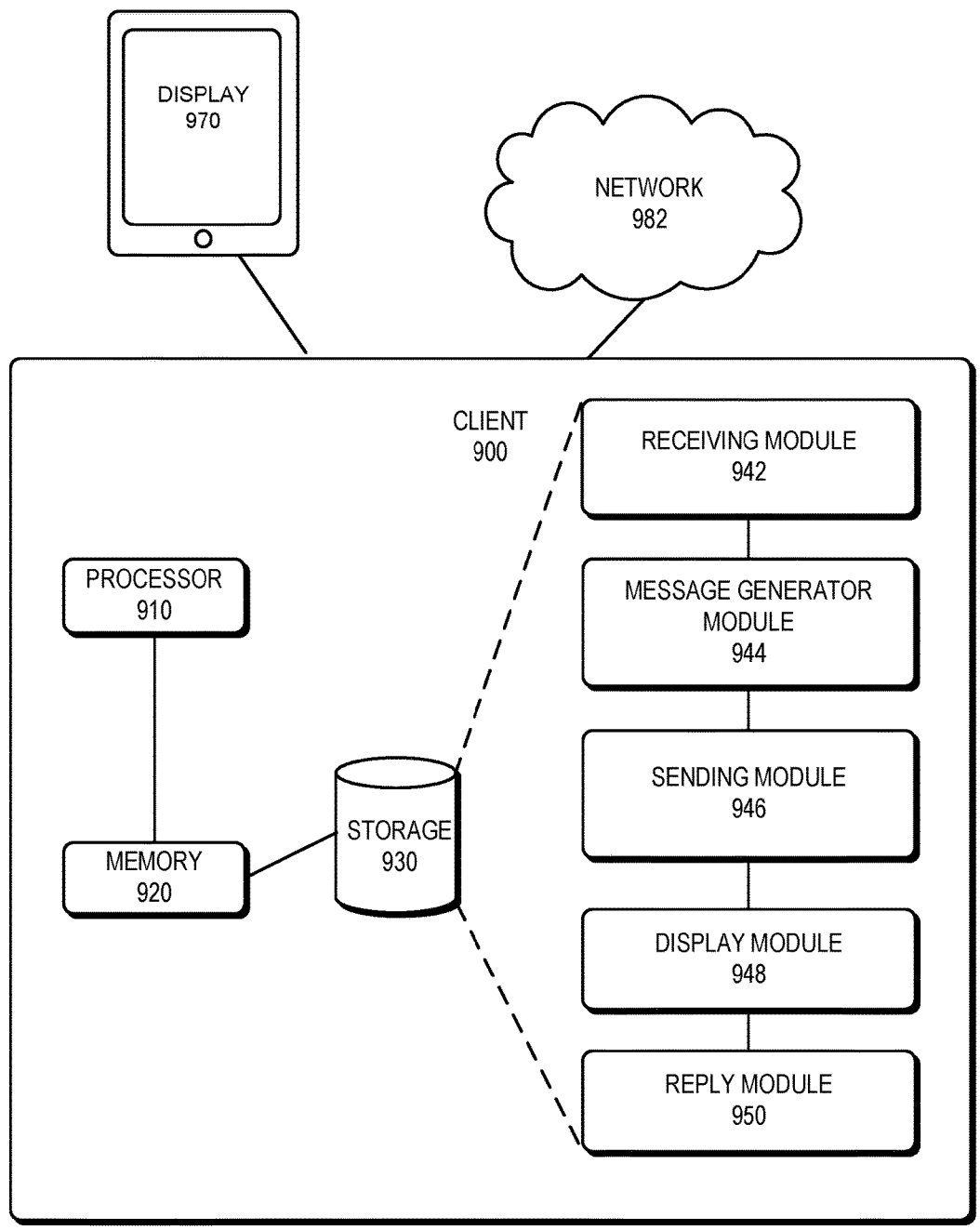
FIG. 9 presents a block diagram illustrating an exemplary client in a computing system for providing private chat within a group chat, in accordance with an embodiment of the present application.

FIG. 9 presents a block diagram illustrating an exemplary client in a computing system for providing private chat within a group chat, in accordance with an embodiment of the present application. Client 900 includes a processor 910, a memory 920, and a storage device 930. Storage 930 typically stores instructions that can be loaded into memory 920 and executed by processor 910 to perform the methods described above. In one embodiment, the instructions in storage 930 can implement a receiving module 942, a message generator module 944, a sending module 946, a display module 948, and a reply module 950, which can communicate with each other through various means.

In some embodiments, modules 942-950 can be partially or entirely implemented in hardware and can be part of processor 910. Further, in some embodiments, the client may not include a separate processor and memory. Instead, in addition to performing their specific tasks, modules 942-950, either separately or in concert, may be part of special-purpose computation engines.

Storage 930 stores programs to be executed by processor 910. Specifically, storage 930 stores a program that implements a client (e.g., application) for private chat within a group chat. During operation, the application program can be loaded from storage 930 into memory 920 and executed by processor 910. As a result, client 900 can perform the functions described above. Client 900 further includes a display 970, and can be coupled via one or more network interfaces to a network 982.

Receiving module 942 may receive an input message from the user.

Message generator module 944 may generate a first message that includes a first private chat identifier, private chat counterpart information, and private chat content data. The first message allows a server to use the first private chat identifier and private chat counterpart information to determine a private chat counterpart client. The server may generate a private chat message based on the first message and send the private chat message only to the private chat counterpart client.

Sending module 946 may send the first message to a server.

Display module 948 may display a message received from the server in a display area. The message may include a group chat message and a private chat message. The private chat message may include a second private chat identifier. The client may determine that the message received is a private chat message based on the second private chat identifier, and display the group chat message and private chat message in different ways.

Reply module 950 may add a private chat message reply area to a private chat message display box of a display area. Reply module 950 may receive a private chat message reply entered by the user through the private chat message reply area. Reply module 950 may also automatically add a first private chat identifier and private chat counterpart information to the private chat message reply.

Exemplary Server

Figure 10:
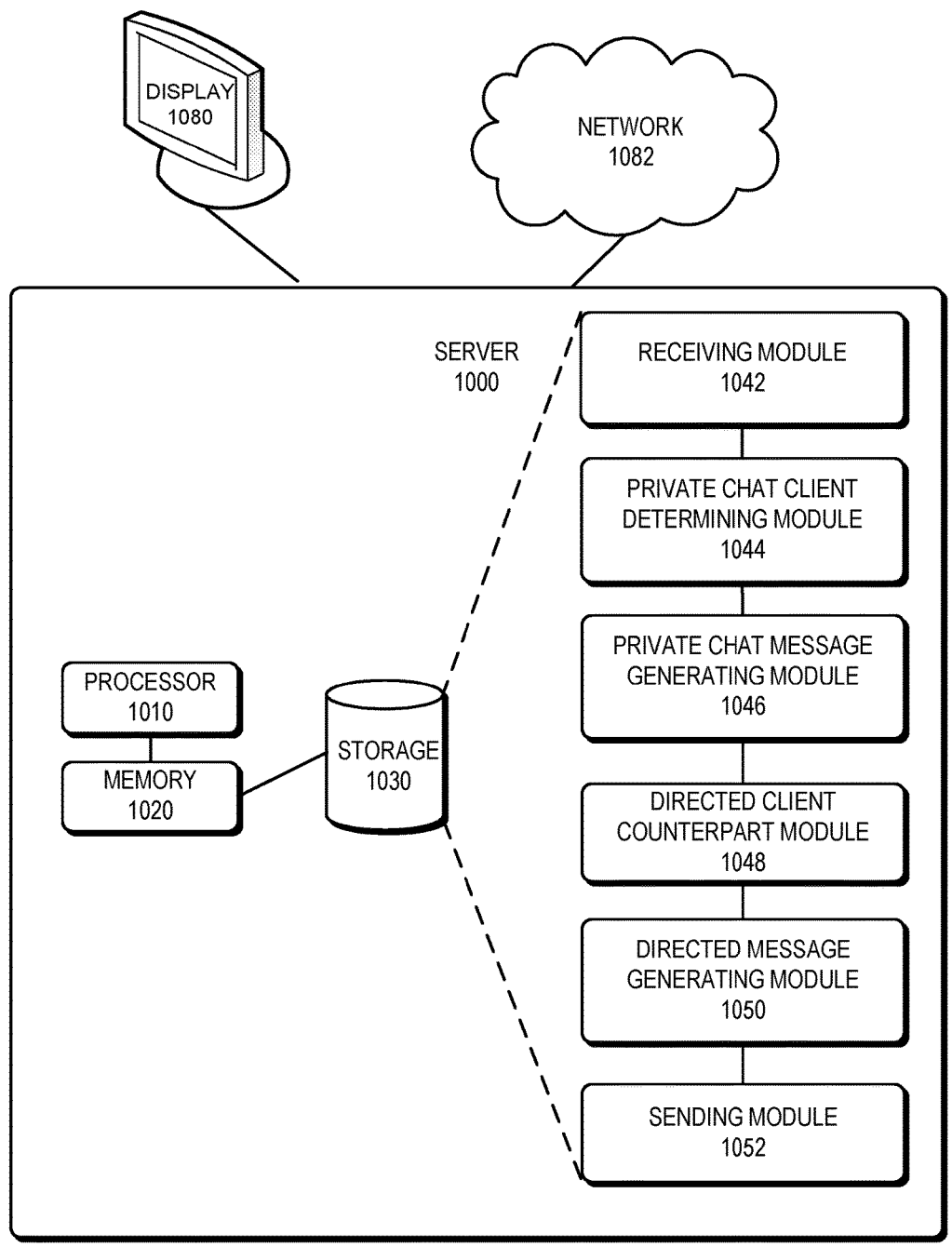
FIG. 10 presents a block diagram illustrating an exemplary server in a computing system for providing private chat within a group chat, in accordance with an embodiment of the present application.

FIG. 10 presents a block diagram illustrating an exemplary server in a computing system for providing private chat within a group chat, in accordance with an embodiment of the present application. Server 1000 includes a processor 1010, a memory 1020, and a storage device 1030. Storage 1030 typically stores instructions that can be loaded into memory 1020 and executed by processor 1010 to perform the methods described above. In one embodiment, the instructions in storage 1030 can implement a receiving module 1042, a private chat client determining module 1044, a private chat message generating module 1046, a directed client counterpart module 1048, a directed message generating module 1050, and a sending module 1052, which can communicate with each other through various means.

In some embodiments, modules 1042-1052 can be partially or entirely implemented in hardware and can be part of processor 1010. Further, in some embodiments, the server may not include a separate processor and memory. Instead, in addition to performing their specific tasks, modules 1042-1052, either separately or in concert, may be part of special-purpose computation engines.

Storage 1030 stores programs to be executed by processor 1010. Specifically, storage 1030 stores a program that implements a server (e.g., application) for private chat within a group chat. During operation, the application program can be loaded from storage 1030 into memory 1020 and executed by processor 1010. As a result, server 1000 can perform the functions described above. Server 1000 can further include a display 1080, and can be coupled via one or more network interfaces to a network 1082.

Receiving module 1042 may receive a first message from a client. The first message may include a first private chat identifier, private chat counterpart information, and private chat content data. In some embodiments, receiving module 1042 may also receive a first directed identifier, directed counterpart information, and publishing content information as input information from the client.

Private chat client determining module 1044 may determine a private chat counterpart client based on the first private chat identifier and private chat counterpart information. Private chat message generating module 1046 may generate a private chat message based on the private chat content data. Directed client counterpart module 1048 may determine a directed counterpart publishing client based on the first directed identifier and directed counterpart information. Directed message generating module 1050 may generate a directed message based on the input information received from the client. Sending module 1052 may send the private chat message only to the private chat counterpart client, and may send messages that are not private to every member of a group. In some embodiments, sending module 1052 may send the directed message only to the directed counterpart publishing client, and may send messages that are not directed to every fan following a publishing client.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module.

Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for private chat within a group chat performed by a server, comprising:
   receiving, by the server from a user of a computing device, a first message that includes a first private chat identifier, private chat counterpart information, and first private chat content data;
   determining a private chat counterpart client based on the first private chat identifier and the private chat counterpart information, wherein the private chat counterpart client and the computing device are both participating in the group chat;
   generating a first private chat message based on the first message including the first private chat content data;
   sending the private chat message to the private chat counterpart client without sending the private chat message to all members participating in the group chat;
   receiving, by the server from the user of the computing device, a second message that includes a private chat counterpart exclusion identifier, private chat counterpart exclusion information, and second private chat content data;
   removing from a client list a client based on the private chat counterpart exclusion identifier and the private chat counterpart exclusion information included in the second message, wherein the client list includes all members of the group chat or one or more private chat counterpart clients associated with a previously sent private chat message;
   generating a second private chat message based on the second message including the second private chat content data; and
   sending the second private chat message to remaining clients on the client list.

2. The method of claim 1, wherein the first private chat message includes a second private chat identifier which allows the private chat counterpart client to determine that the first private chat message is privately sent to the private chat counterpart client without being sent to other group members participating in the group chat.

3. The method of claim 1, further comprising:
   determining that the first private chat identifier is a selection identifier; and
   determining that a client corresponding to the private chat counterpart information is a private chat counterpart client.

4. The method of claim 1, further comprising:
   determining that the first private chat identifier is an exclusion identifier;
   removing from the client list a client corresponding to the private chat counterpart information; and
   determining that the remaining clients on the client list are private chat counterpart clients.

5. The method of claim 1, further comprising:
   receiving input information sent from a publishing client, wherein the input information includes a first directed identifier, directed counterpart information and publishing content information;
   determining a directed counterpart client based on the first directed identifier and the directed counterpart information;
   generating a directed message based on the input information; and
   sending the directed message only to the directed counterpart client.

6. A computing system comprising:
   one or more processors;
   a memory; and
   a computer-readable medium coupled to the one or more processors storing instructions stored that, when executed by the one or more processors, cause the computing system to perform a method for private chat within a group chat performed by a server, the method comprising:
   receiving, by the server from a user of a computing device, a first message that includes a first private chat identifier, private chat counterpart information, and first private chat content data;
   determining a private chat counterpart client based on the first private chat identifier and the private chat counterpart information, wherein the private chat counterpart client and the computing device are both participating in the group chat;

generating a first private chat message based on the first message including the first private chat content data;

sending the private chat message to the private chat counterpart client without sending the private chat message to all members participating in the group chat;

receiving, by the server from the user of the computing device, a second message that includes a private chat counterpart exclusion identifier, private chat counterpart exclusion information, and second private chat content data;

removing from a client list a client based on the private chat counterpart exclusion identifier and the private chat counterpart exclusion information included in the second message, wherein the client list includes all members of the group chat or one or more private chat counterpart clients associated with a previously sent private chat message;

generating a second private chat message based on the second message including the second private chat content data; and sending the second private chat message to remaining clients on the client list.

7. The system of claim 6, wherein the first private chat message includes a second private chat identifier which allows the private chat counterpart client to determine that the first private chat message is privately sent to the private chat counterpart client without being sent to other group members participating in the group chat.

8. The system of claim 6, further comprising:
determining that the first private chat identifier is a selection identifier; and
determining that a client corresponding to the private chat counterpart information is a private chat counterpart client.

9. The system of claim 6, further comprising:
determining that the first private chat identifier is an exclusion identifier;
removing from the client list a client corresponding to the private chat counterpart information; and
determining that the remaining clients on the client list are private chat counterpart clients.

10. The system of claim 6, wherein the method further comprises:
receiving input information sent from a publishing client, wherein the input information includes a first directed identifier, directed counterpart information and publishing content information;
determining a directed counterpart client based on the first directed identifier and the directed counterpart information;
generating a directed message based on the input information; and
sending the directed message only to the directed counterpart client.

11. A non-transitory computer-readable storage medium storing instructions that when executed by a computer cause the computer to perform a method for private chat within a group chat performed by a server, the method comprising:
receiving, by the server from a user of a computing device, a first message that includes a first private chat identifier, private chat counterpart information, and first private chat content data;
determining a private chat counterpart client based on the first private chat identifier and the private chat counterpart information, wherein the private chat counterpart client and the computing device are both participating in the group chat;

generating a first private chat message based on the first message including the first private chat content data;

sending the private chat message to the private chat counterpart client without sending the private chat message to all members participating in the group chat;

receiving, by the server from the user of the computing device, a second message that includes a private chat counterpart exclusion identifier, private chat counterpart exclusion information, and second private chat content data;

removing from a client list a client based on the private chat counterpart exclusion identifier and the private chat counterpart exclusion information included in the second message, wherein the client list includes all members of the group chat or one or more private chat counterpart clients associated with a previously sent private chat message;

generating a second private chat message based on the second message including the second private chat content data; and sending the second private chat message to remaining clients on the client list.

12. The non-transitory computer-readable storage medium of claim 11, wherein the first private chat message includes a second private chat identifier which allows the private chat counterpart client to determine that the first private chat message is privately sent to the private chat counterpart client without being sent to other group members participating in the group chat.

13. The non-transitory computer-readable storage medium of claim 11, wherein the method further comprises:
determining that the first private chat identifier is a selection identifier; and
determining that a client corresponding to the private chat counterpart information is a private chat counterpart client.

14. A non-transitory computer-readable storage medium storing instructions that when executed by a computer cause the computer to perform a method for private chat within a group chat, the method comprising:
receiving a first set of input information from a user on the computer, wherein the computer is a client computing device;
generating a first message based on the first set of input information, wherein the first set of input information includes a first private chat identifier, private chat counterpart information, and first private chat content data;
sending the first message to a server, which causes the server to:
determine a client that is a private chat counterpart based on the first private chat identifier and private chat counterpart information,
generate a first private chat message based on the first message,
send the private chat message only to the client that is the private chat counterpart;
receiving a response message sent by the server in response to the first message;
displaying the response message on a user interface display of the computer;
receiving a second set of input information from the user on the computer;
generating a second message that includes a private chat counterpart exclusion identifier, private chat counterpart exclusion information, and second private chat content data; and sending the second message to the server, which causes the server to:
- remove from a client list a client based on the private chat counterpart exclusion identifier and the private chat counterpart exclusion information included in the second message, wherein the client list includes all members of the group chat or one or more private chat counterpart clients associated with a previously sent private chat message;
- generate a second private chat message based on the second message including the second private chat content data; and
- send the second private chat message to remaining clients on the client list.

15. The non-transitory computer-readable storage medium of claim 14, wherein the method further comprises:
receiving, from the server, a third message that includes a group chat message and a private chat message, wherein the private chat message includes a second private chat identifier;
determining, based on the second private chat identifier, that one of the two messages included in the third message is a private chat message; and
displaying the group chat message and the private chat message differently.

16. The non-transitory computer-readable storage medium of claim 14, wherein the method further comprises:
adding a private chat message reply area to a private chat message display box depicted on a display area of the client computing device;
receiving a user's private chat message reply through the private chat message reply area; and
in response to receiving the user's private chat message reply, automatically adding to the user's private chat message reply the first private chat identifier and the private chat counterpart information.

* * * * *

UNITED STATES PATENT AND TRADEMARK OFFICE
CERTIFICATE OF CORRECTION

PATENT NO. : 10,218,657 B2
APPLICATION NO. : 15/068203
DATED : February 26, 2019
INVENTOR(S) : Chong Shing Cheung Page 1 of 1

It is certified that error appears in the above-identified patent and that said Letters Patent is hereby corrected as shown below:

On the Title Page

Item (30) Foreign Application Priority Data' portion is missing. The priority that should be listed is CN 201510125115.8 (03/20/2015).

Signed and Sealed this
Tenth Day of December, 2019

Andrei Iancu
*Director of the United States Patent and Trademark Office*